(No Model.)

H. CATSIFF.
BASKET TRAP FOR WATER CLOSETS, &c.

No. 594,169. Patented Nov. 23, 1897.

Witnesses.
A. V. Groupe
F. M. Freeburg

Inventor.
Herman Catsiff,
per John R. Nolan
Attorney.

UNITED STATES PATENT OFFICE.

HERMAN CATSIFF, OF PHILADELPHIA, PENNSYLVANIA.

BASKET-TRAP FOR WATER-CLOSETS, &c.

SPECIFICATION forming part of Letters Patent No. 594,169, dated November 23, 1897.

Application filed November 2, 1896. Serial No. 610,789. (No model.)

*To all whom it may concern:*

Be it known that I, HERMAN CATSIFF, a citizen of the United States, residing in the city and county of Philadelphia and State of Pennsylvania, have invented certain new and useful Improvements in Basket-Traps for Water-Closets, &c., of which the following is a full, clear, and exact description, reference being had to the accompanying drawings, forming a part of this specification.

The object of this invention is to provide a receptacle of novel construction which may be readily applied to the outlet or stand pipes of water-closets, &c., in a manner to receive and retain rags, sticks, and other like foreign bodies that may be introduced to the hopper and would otherwise enter and clog up the main trap or water seal, and which receptacle may be as readily removed to permit its contents to be discharged, as occasion may require.

To this end the invention, as generally stated, comprises a skeleton basket of wire or the like and means for suspending the same at the mouth of the main trap or seal.

The invention also comprises features of construction which will hereinafter appear.

Figure 1:
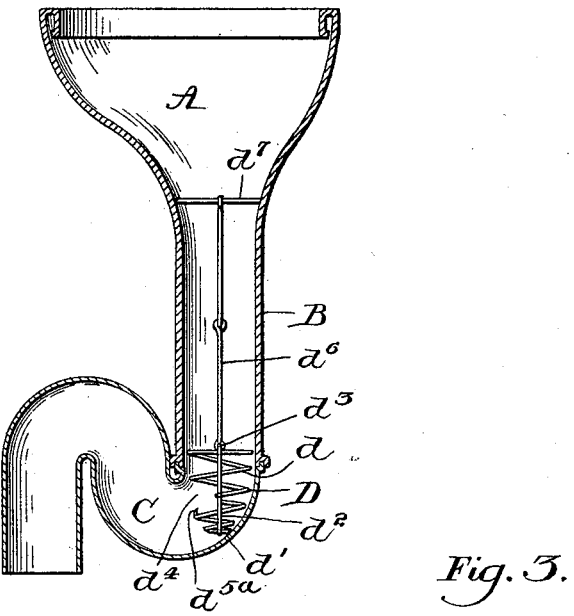
Figure 2:
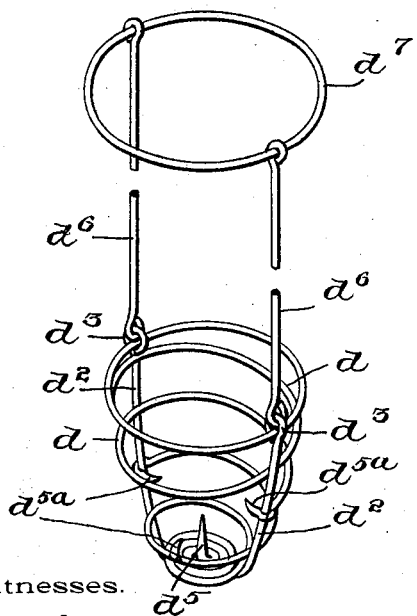
Figure 3:
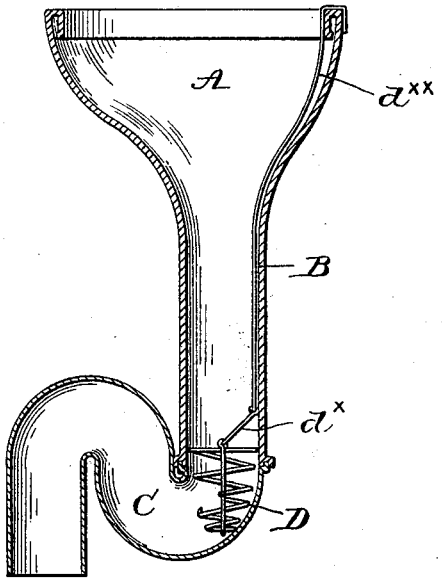

In the drawings, Figure 1 is a vertical section of the hopper, outlet, and trap of a water-closet to which my improved basket-trap is applied. Fig. 2 is a perspective view of said basket-trap. Fig. 3 is a view similar to Fig. 1, showing a modification of the suspensory devices for the basket-trap.

A represents the hopper or bowl of a water-closet, B the outlet or stand pipe leading therefrom, and C the trap or water seal in said pipe, all being of usual and well-known construction.

D is my improved "basket-trap," as I have termed it, the same being suspended in the pipe B, so as to lie at the mouth of the trap C, to the end that any rubbish, &c., which may enter the outlet-pipe will be intercepted by the basket and thus be prevented from entering trap C. The basket-trap in its preferred form is constructed of wire, which is wound in open spiral coils to form the sides $d$ and in close or contracted coils to form the bottom $d'$. Embracing the sides and bottom is a yoke-frame $d^2$, the extremities of which are looped around the uppermost coil of the basket to form the eyes $d^3$. This yoke is also soldered or otherwise secured to the respective body-coils, so as to support and strengthen the structure. A part of one or more of the lateral coils is removed, so as to form an enlarged opening $d^4$, that is designed to lie at the mouth of the trap C and permit the passage of excretions thereto. The lower extremity of the wire is bent upward within the interior of the basket, so as to provide a point $d^5$, which will engage rags or the like and prevent their passage through the opening $d^2$. For a like purpose projecting points $d^{5a}$ are formed on or secured to the coils at said opening. Connected with the eyes $d^3$ are the lower ends of suspension-links $d^6$, their upper ends being attached to a ring $d^7$, which is designed to be seated within or at the neck of the hopper and thus support the basket in proximity to the trap C, as indicated in Fig. 1. In order to extract the basket for the purpose of removing the accumulations, if any, therefrom, the ring is grasped by means of a hook, a pair of tongs, or other suitable implement and the structure thereby bodily lifted out.

In Fig. 3 is shown a modification of the suspensory means for the basket. This construction comprises a bail $d^\times$, looped to the ends of the yoke-frame and adapted to lie against the side of the pipe, and a rod $d^{\times\times}$, connected with said bail and provided at its upper end with a hook which engages the upper edge of the hopper. This rod is preferably bent so as to lie against the side of the pipe and hopper.

I claim—

1. A basket-trap for water-closets, &c., comprising the receptacle of spirally-wound wire with the lateral opening $d^4$ therein, the yoke-frame embracing said receptacle, and the suspensory devices, substantially as described.

2. A basket-trap for water-closets, &c., comprising the receptacle of spirally-wound wire with the opening $d^4$ therein, the inwardly-projecting points, and the suspensory devices, substantially as described.

3. A basket-trap for water-closets, &c., comprising the receptacle of spirally-wound wire, the yoke-frame, the links connected therewith, and the ring, substantially as described.

4. In a basket-trap for water-closets, &c., the receptacle of wire wound in open spiral coils to form the sides and in close or contracted coils to form the bottom, part of one or more of said coils being removed to form the enlarged lateral opening $d^4$, the yoke-frame embracing said coils and secured thereto, and suspensory devices connected with the extremities of the yoke-frame, substantially as described.

In testimony whereof I have hereunto affixed my signature in the presence of two subscribing witnesses.

HERMAN $\overset{\text{his}}{\times}$ CATSIFF.
mark

Witnesses:
JOHN R. NOLAN,
ANDREW V. GROUPE.